United States Patent [19]
Durand

[11] Patent Number: 5,880,730
[45] Date of Patent: *Mar. 9, 1999

[54] SYSTEM AND METHOD FOR AUTOMATICALLY CREATING A DESKTOP ICON FOR ACCESS TO A REMOTE RESOURCE

[75] Inventor: Gordon A. Durand, San Jose, Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 807,550

[22] Filed: Feb. 28, 1997

[51] Int. Cl.$^6$ ........................................................ G06F 3/14
[52] U.S. Cl. .......................... 345/348; 345/335; 345/339; 707/501
[58] Field of Search .................................... 345/339, 329, 345/348, 332, 349

[56] References Cited

U.S. PATENT DOCUMENTS 5,598,524  1/1997  Johnston, Jr. et al. ................. 345/348

5,675,510  10/1997  Coffey et al. .

OTHER PUBLICATIONS

Jacquelyn Gavron et al, How to use Microsoft NT 4 Workstation Ziff and Davis Press, an Imprint of MacMillon Computer USA pp. 28–31, p. 154; attachment of screen dumps from NT 4 operation, 1996.

Primary Examiner—Raymond J. Bayerl
Assistant Examiner—Chadwick A. Jackson
Attorney, Agent, or Firm—Baker & Botts, L.L.P.

[57] ABSTRACT

A system and method are provided for automatically creating a desktop icon for access to a remote resource. A text drop event in a desktop area of a user interface is identified, and the associated dropped text is analyzed. It is determined whether the dropped text is a recognized format for a path name to a remote resource. If the dropped text is a recognized format, a desktop icon is created for access to the remote resource based upon the recognized format and the dropped text.

20 Claims, 14 Drawing Sheets

5,880,730

SYSTEM AND METHOD FOR AUTOMATICALLY CREATING A DESKTOP ICON FOR ACCESS TO A REMOTE RESOURCE

TECHNICAL FIELD OF THE INVENTION

This invention relates in general to the field of electronic systems, and more particularly to a system and method for automatically creating a desktop icon for access to a remote resource.

BACKGROUND OF THE INVENTION

Computer system users often obtain path names for remote resources, such as an http URL identifying a web resource or a path name for a remote file, in textual form in e-mail messages or in other textual forms. Typically, the interactive process of using that textual path name to access the associated remote resource involves retyping or moving text among multiple windows and applications and can be time consuming and frustrating for users. It is desirable to provide users with a less complicated way to convert a textual path name into a convenient means for accessing the remote resource. One means for accessing a remote resource comprises using a separately executed application to create a jumpsite desktop icon, as described in U.S. patent application Ser. No. 08/580,742, entitled "Graphical Method and System for Accessing Information on a Communications Network", that accesses a designated web page when opened.

SUMMARY OF THE INVENTION

In accordance with the present invention, a system and method for automatically creating a desktop icon for access to a remote resource are provided that provide advantages over conventional user desktop interfaces.

According to one aspect of the present invention, a system and method are provided for automatically creating a desktop icon for access to a remote resource. A text drop event in a desktop area of a user interface is identified, and the associated dropped text is analyzed. The text drop event can include a user dragging and dropping text into the desktop area, pasting text into the desktop area, or otherwise locating text within the desktop area. It is then determined whether the dropped text is a recognized format for a path name to a remote resource. If the dropped text is a recognized format, a desktop icon is created for access to the remote resource based upon the recognized format and the dropped text. In one embodiment of the present invention, the recognized formats include an http URL, an ftp URL, a host/path specifier, and mail, news, file, and gopher paths.

A technical advantage of the present invention is the automation of creating desktop icons for accessing remote resources. In particular, the process is integrated into a user interface. The present invention obviates the need for the user to invoke and deal with separate icon-creating or icon-retrieving applications.

BRIEF DESCRIPTION OF THE DRAWINGS

A more complete understanding of the present invention and advantages thereof may be acquired by referring to the following description, taken in conjunction with the accompanying drawings, in which like reference numbers indicate like features and wherein.

DETAILED DESCRIPTION OF THE INVENTION

Figure 1:
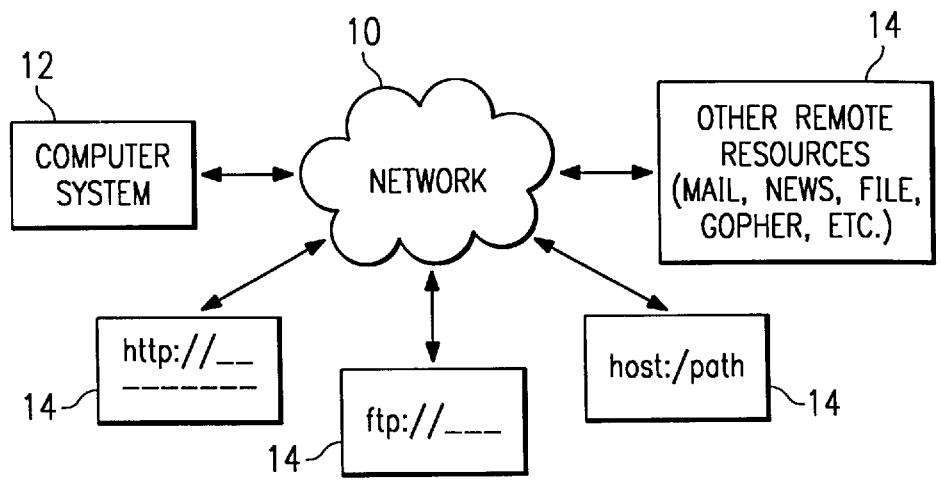
FIG. 1 is a block diagram of a network providing connectivity between a computer system and remote resources.

FIG. 1 is a block diagram of a network 10 providing connectivity between a computer system 12 and remote resources 14. Computer system 12 is connected to network 10 which allows computer system 12 to access remote resources 14. As shown, remote resources 14 can include http sites, ftp sites, host:\path resources and other remote resources such as electronic mail, news, files, gopher, etc. An operating system is executed on computer system 12 and provides a user interface on a display to the user. According to the present invention, the operating system is operable to automatically create desktop icons for access to remote resources 14.

Figure 2:
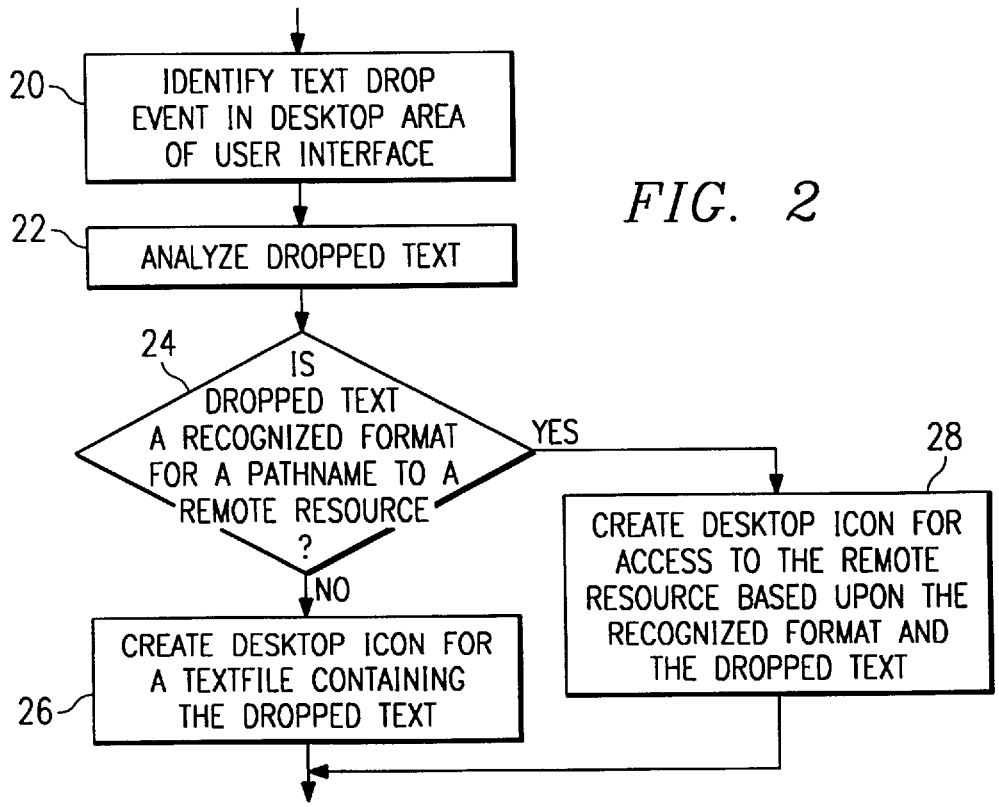
FIG. 2 is a flow chart of one embodiment of a method for automatically creating a desktop icon for access to a remote resource.

FIG. 2 is a flow chart of one embodiment of a method for automatically creating a desktop icon for access to a remote resource. Although the method is accomplished through the operation of the operating system, it should be understood the method could be accomplished through the operation of other appropriate software applications.

In step 20 of FIG. 2, the operating system identifies a text drop event in a desktop area of the user interface. As used herein, "text drop event" can include a user dragging and dropping text into the desktop area, pasting text into the desktop area, or otherwise locating text within the desktop area. Further, it should be understood that "dropped text" refers to the text that is so located within the desktop area. In one embodiment, desktop areas that trigger automatic creation of desktop icons include the background, a directory view and folders within a directory view of the user interface.

In step 22, the operating system analyzes the dropped text. This analysis can include parsing the dropped text to separate the text into components. Then, in step 24, the operating system determines whether the dropped text is a recognized format for a path name to a remote resource. This determination can include comparing the parsed text to expected path name formats. If the text is not a recognized format, then in step 26, the operating system creates a desktop icon for a text file containing the dropped text. If the dropped text is a recognized format, in step 28, the operating system creates a desktop icon for access to the remote resource based upon the recognized format and the dropped text. In one implementation, the desktop icons are created at the location of the text drop event in the desktop or if the text was dropped onto a directory view or folder, the icon can be stored in that directory view or folder. Further, once the icons are created, the icons can be characterized using file typing rules, for example, as described in U.S. Pat. No. 5,226,163.

In this manner, the operating system allows the user simply to select and drop a textual path name anywhere within the desktop area. In response, the operating system automatically analyzes and recognizes the text as a path name and creates an appropriate desktop icon. As an example, the following kinds of text path names and corresponding icons can be supported.

| | |
|---|---|
| http URL | create a jumpsite icon |
| ftp URL | create an icon which will automatically trigger an ftp connection when opened |
| host:\path name | create an icon which will automatically trigger an nfs mount if the host:\path name path combination can be reached via nfs |
| \path | create an icon referencing \path |
| text | create a file containing the selected text and an icon for that text file |

It should be understood that path names for other types of resources could also be supported, such as mail, news, file, gopher, etc.

Figure 3:
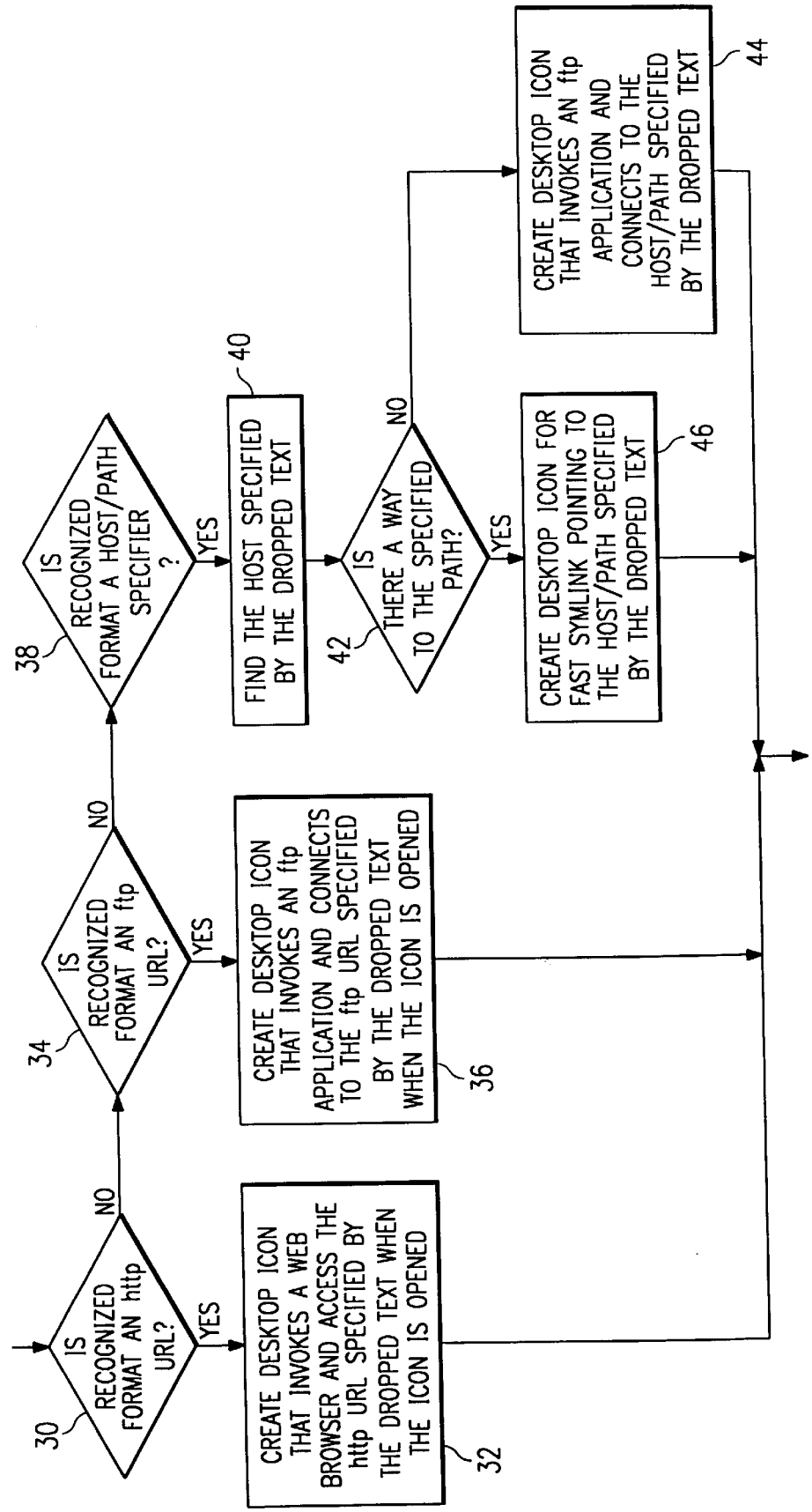
FIG. 3 is one embodiment of a flow chart for creating the desktop icon after a text drop event in the desktop.

FIG. 3 is a flow chart of one embodiment of creating the desktop icon after a text drop event shown as step 28 of FIG. 2. The embodiment of FIG. 3 includes http URLs, ftp URLs, and host\path specifiers as recognized formats. It should be understood that additional path name formats can be supported in which case the operating system would also recognize those formats and create appropriate desktop icons.

In step 30, the operating system checks whether the recognized format is an http URL. If so, in step 32, the operating system creates a desktop icon that, when opened, invokes a web browser and accesses the http URL specified by the dropped text. This type of desktop icon can be referred to as a jumpsite icon.

If the recognized format is not an http URL, the operating system determines, in step 34, whether the recognized format is an ftp URL. If so, then in step 36, the operating system creates a desktop icon that, when opened, invokes an ftp application and connects to the ftp URL specified by the dropped text. This icon is a reference icon that opens a directory view onto the given URL using ftp to view the URL. This provides, for example, easy drag-and-drop functionality from the ftp site.

If the recognized format is not an ftp URL, the operating system determines in step 38 whether the recognized form is a host\path specifier. If so, the operating system, in step 40, finds the host specified by the dropped text. Then, in step 42, the operating system determines whether there is a way to reach the specified host and path via any available network mounts. If not, in step 44, the operating system creates a desktop icon that, when opened, invokes an ftp application and connects to the host\path specified by the dropped text. In step 46, if there is a way to reach the specified path, the operating system creates a desktop icon for a fast symlink pointing to the host\path specified by the dropped text. This is a reference icon that opens a directory view onto the remotely mounted file system.

Figure 4A:
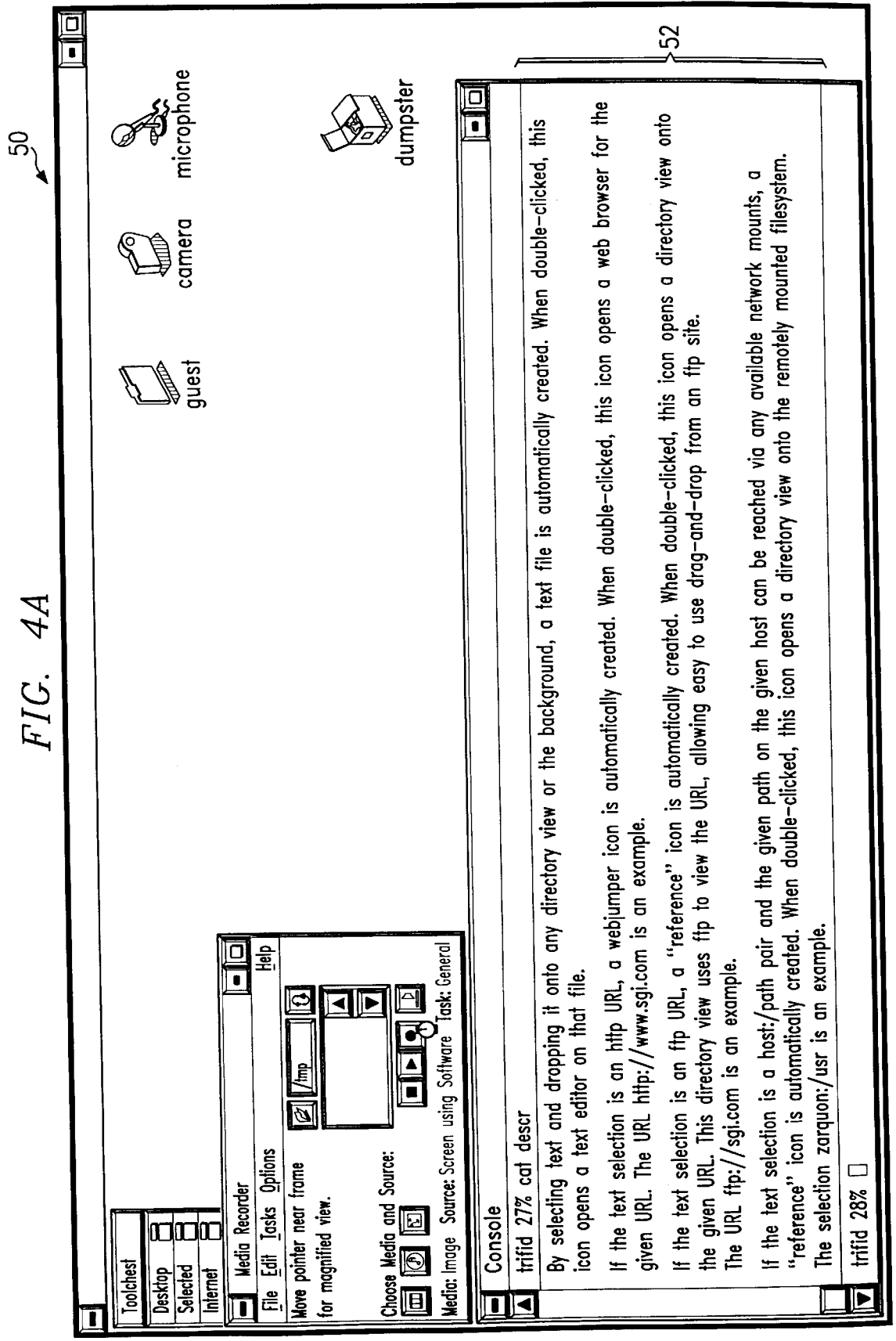
FIGS. 4A, 4B and 4C illustrate one implementation of creating a desktop icon for dropped text.
Figure 4B:
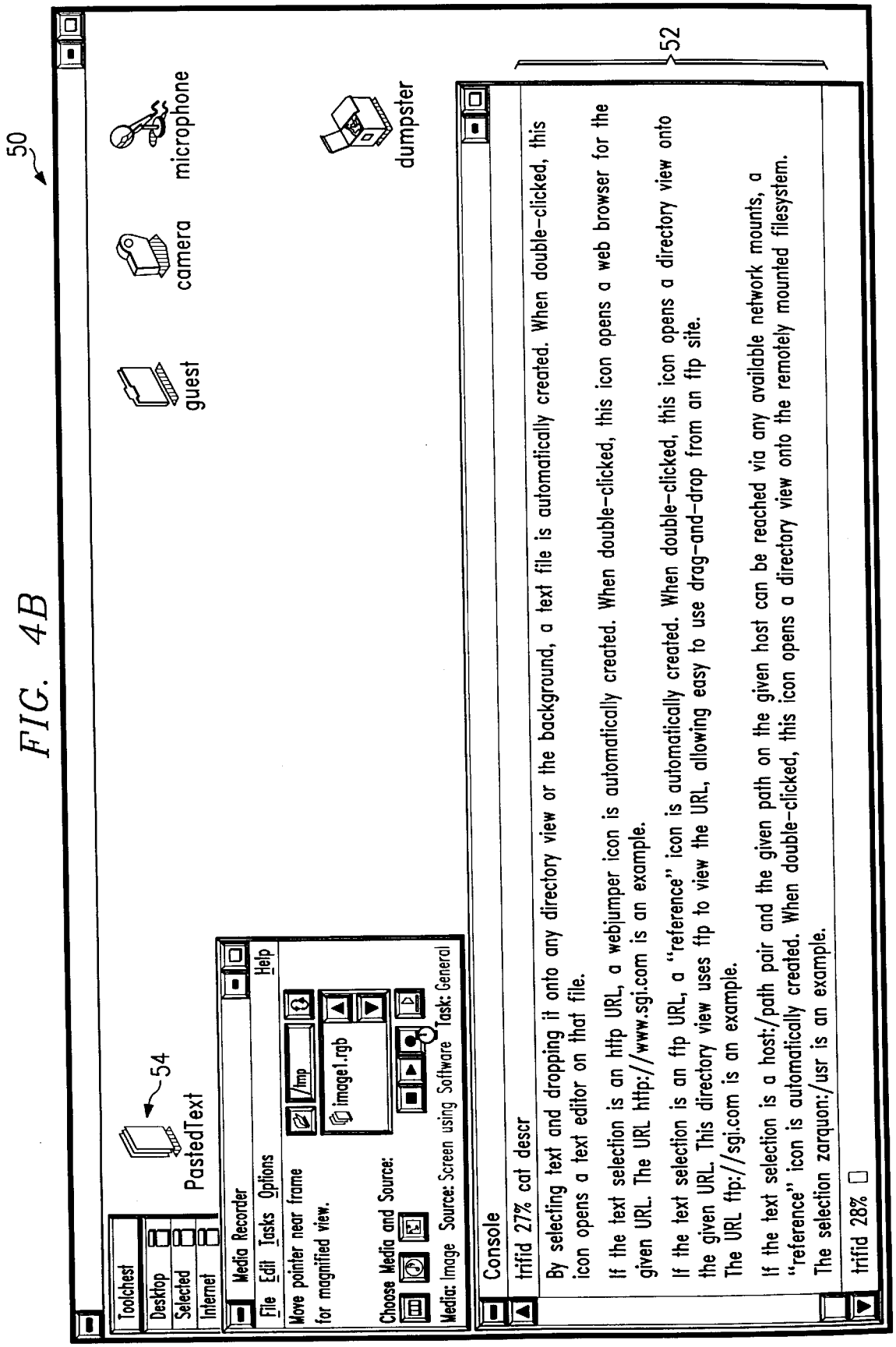
Figure 4C:
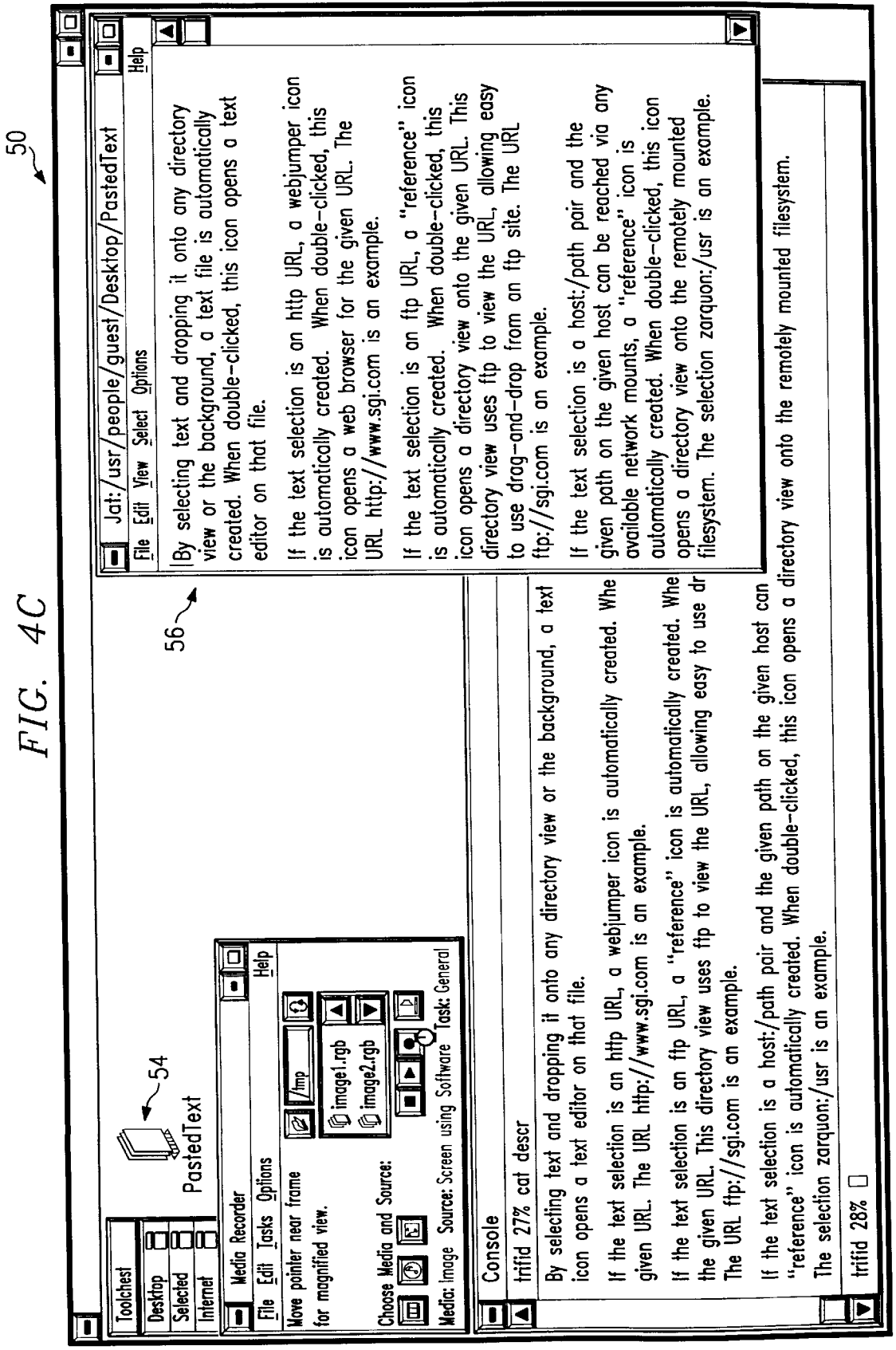

FIGS. 4A, 4B and 4C illustrate one embodiment of creating a text file icon in response to a text drop event. FIG. 4A shows a desktop, indicated generally at 50, which includes several open windows. A block of text, indicated generally at 52, has been selected by the user. In FIG. 4B, the user has dropped the selected text into the desktop such that a text file icon, indicated generally at 54, has been created. As shown, the desktop icon has been given the title "pasted text" and appears as the icon of a text file. In one embodiment, the operating system uses a default word processor as the basis for creating the text file desktop icon 54. FIG. 4C shows desktop 50 after the user has opened the text file icon 54. A window, indicated generally at 56, contains the text that was dropped into the desktop. It can be seen from FIGS. 4A–4C that the dropped text has been associated with the automatically created text file icon 54.

Figure 5A:
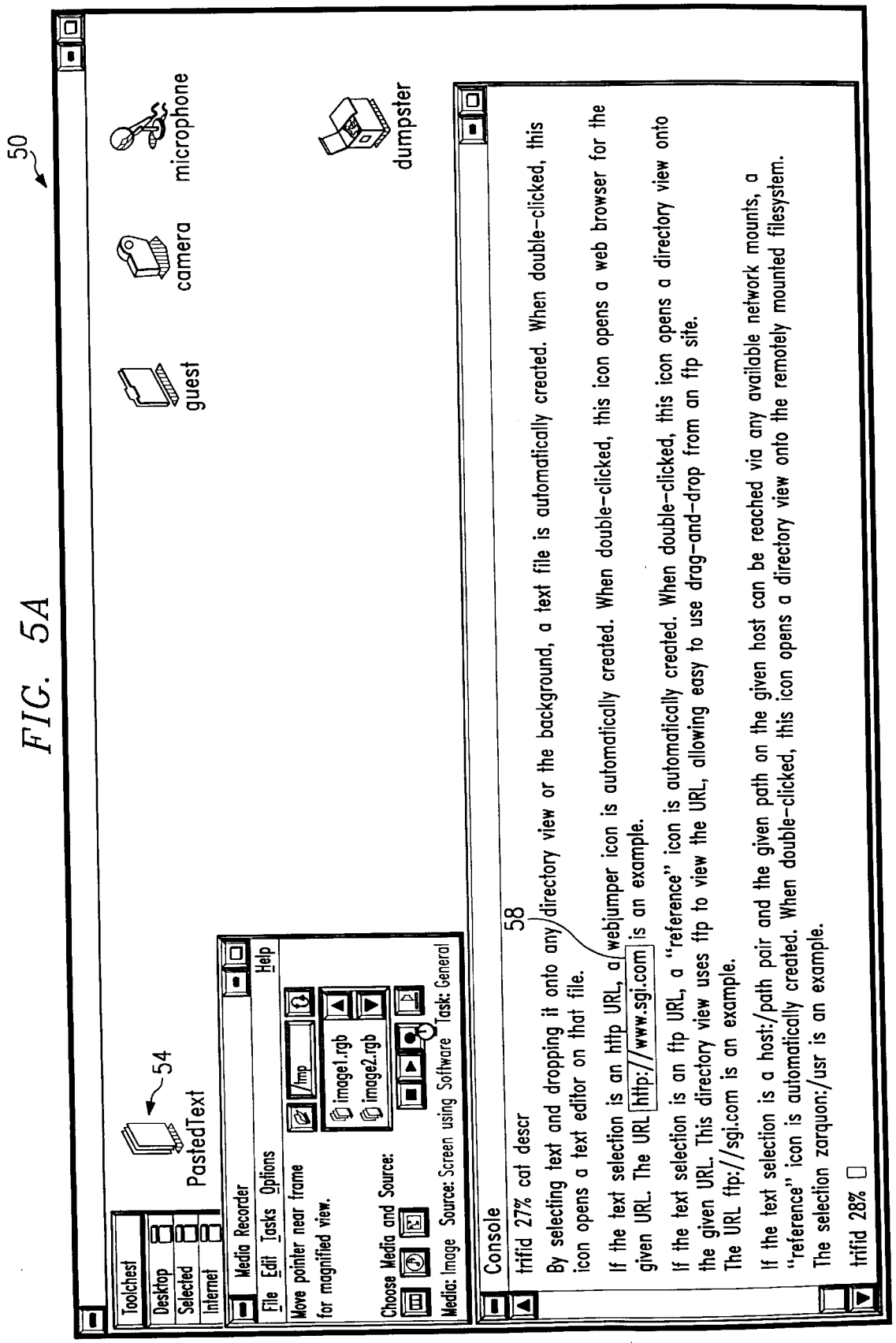
FIGS. 5A, 5B and 5C illustrate one embodiment of creating a desktop icon for a dropped http URL.
Figure 5B:
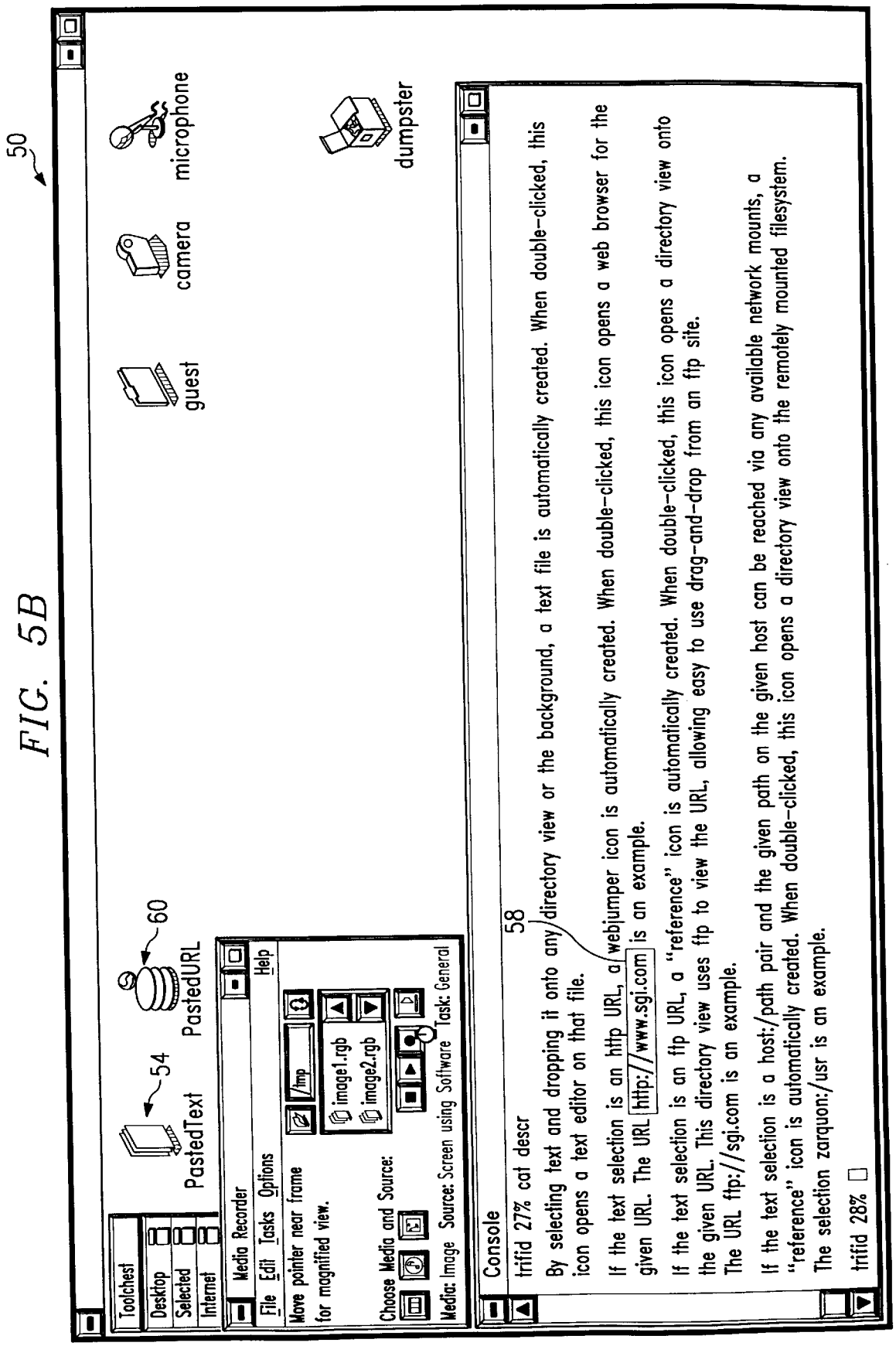
Figure 5C:
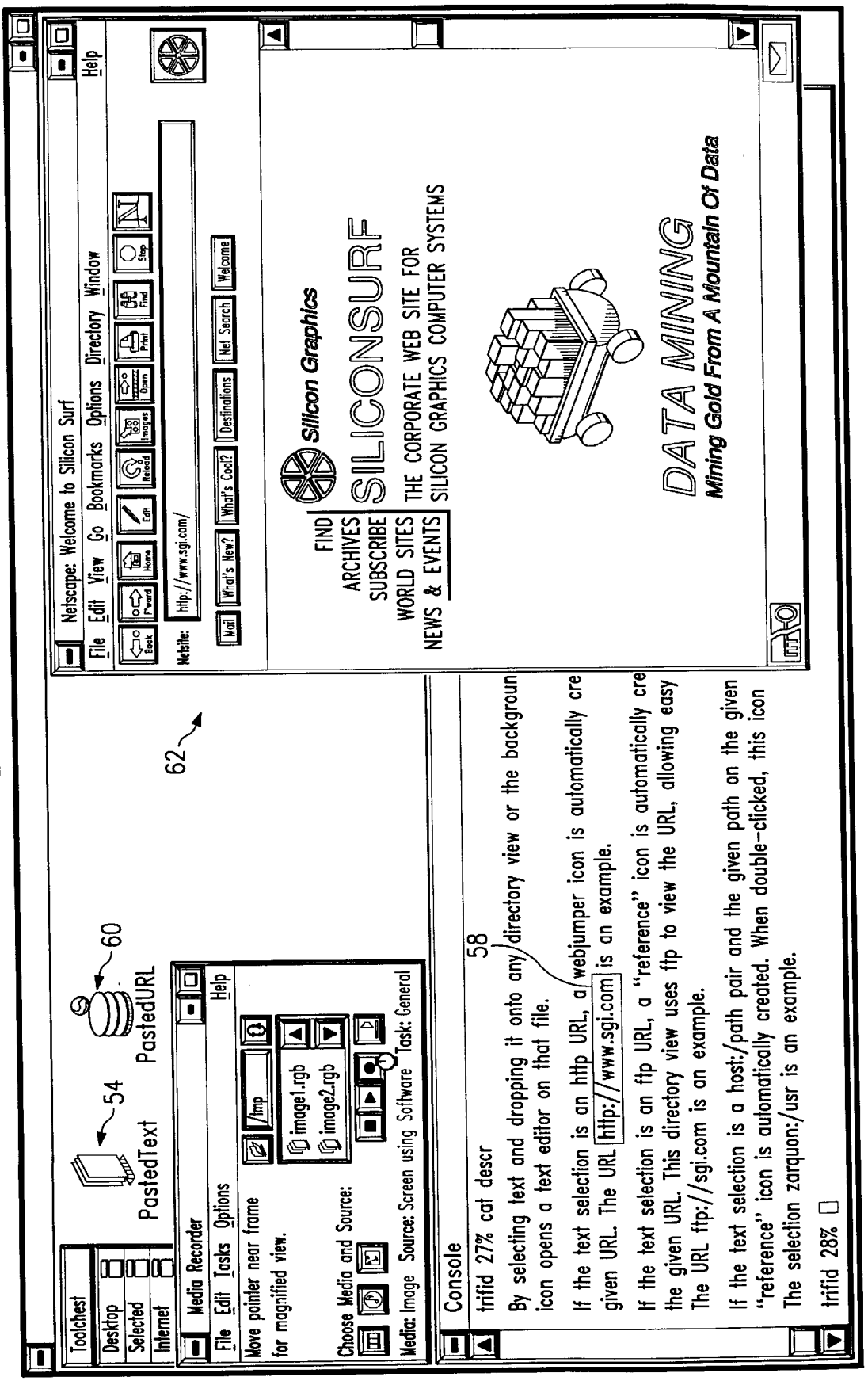

FIGS. 5A, 5B and 5C illustrate one embodiment of creating a desktop icon for a dropped http URL. As shown in FIG. 5A, an http URL, indicated generally at 58, has been selected by the user. FIG. 5B then shows desktop 50 after the user has dropped the selected http URL 58 into desktop 50. In response to this dropped text event, the operating system automatically creates an icon, indicated generally at 60. This icon is entitled "pasted URL" and comprises a jumpsite icon. FIG. 5C illustrates the result of opening jumpsite icon 60. As shown, opening jumpsite icon 60 invokes a web browser window 62 and accesses the dropped http URL. In this case, the dropped http URL is "http:\\www.sgi.com." As can be seen, the operating system creates jumpsite icon 60 based upon the recognized format and the dropped text.

Figure 6A:
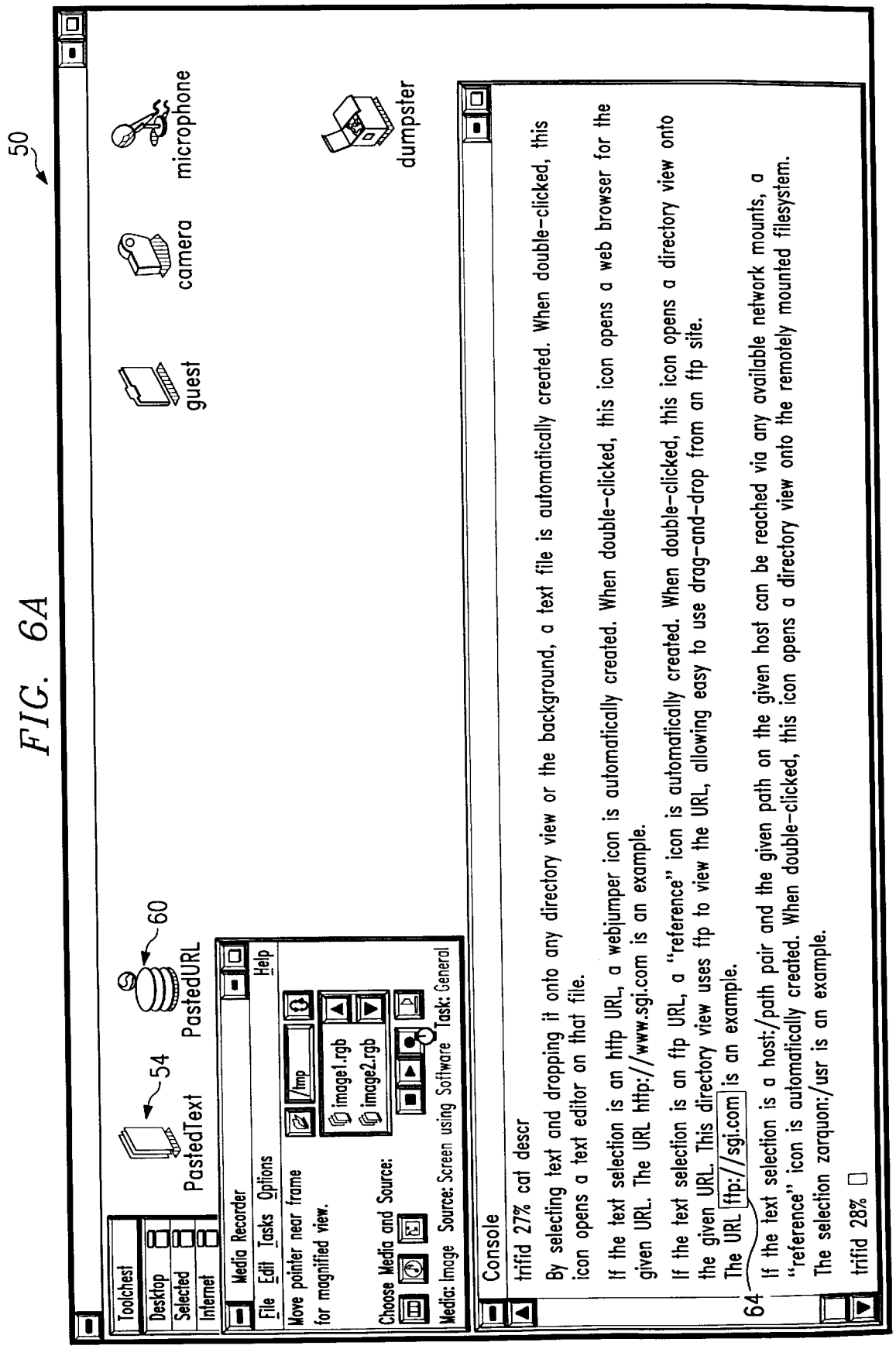
FIGS. 6A, 6B and 6C illustrate one embodiment of creating a desktop icon for a dropped ftp URL.
Figure 6B:
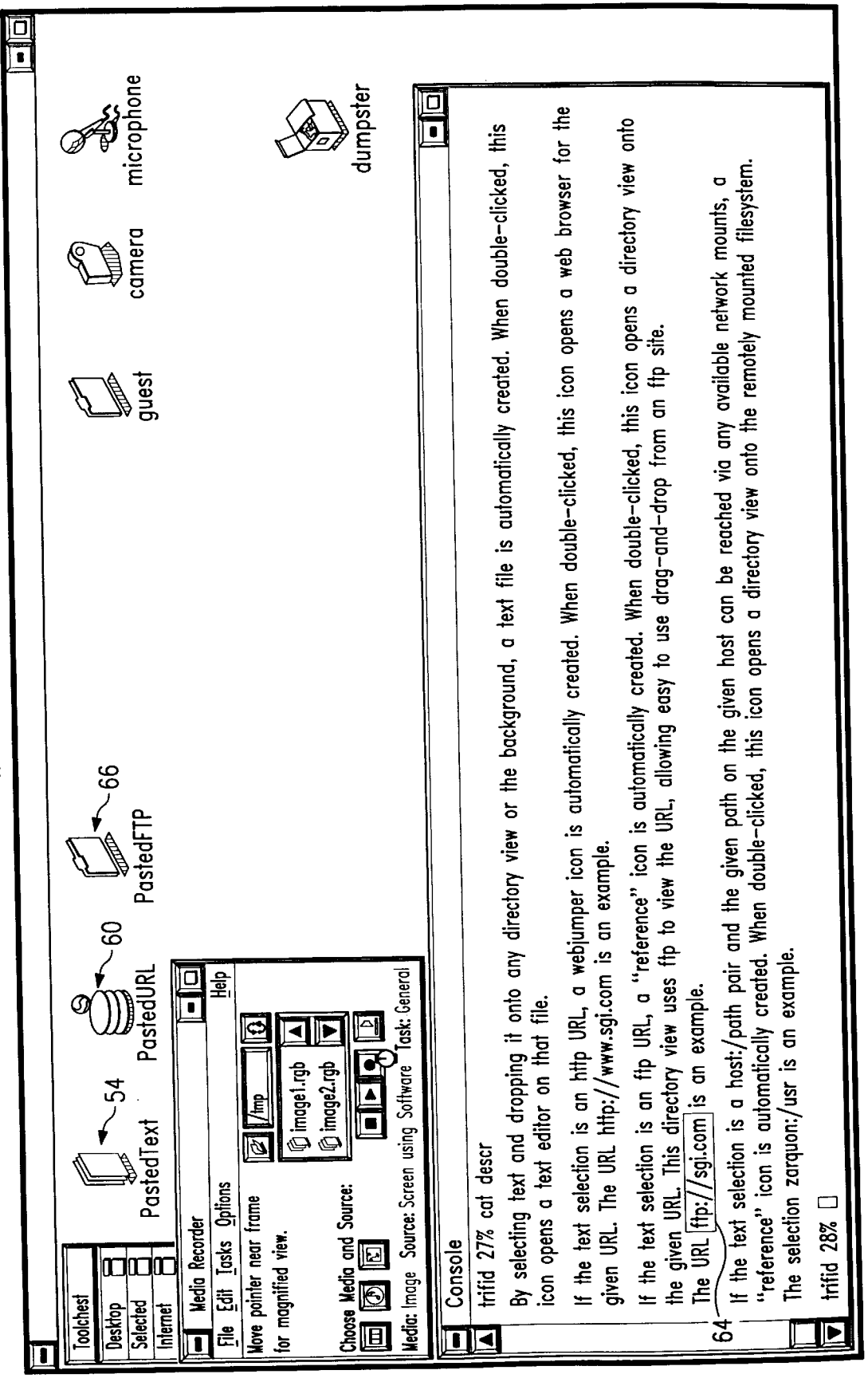
Figure 6C:
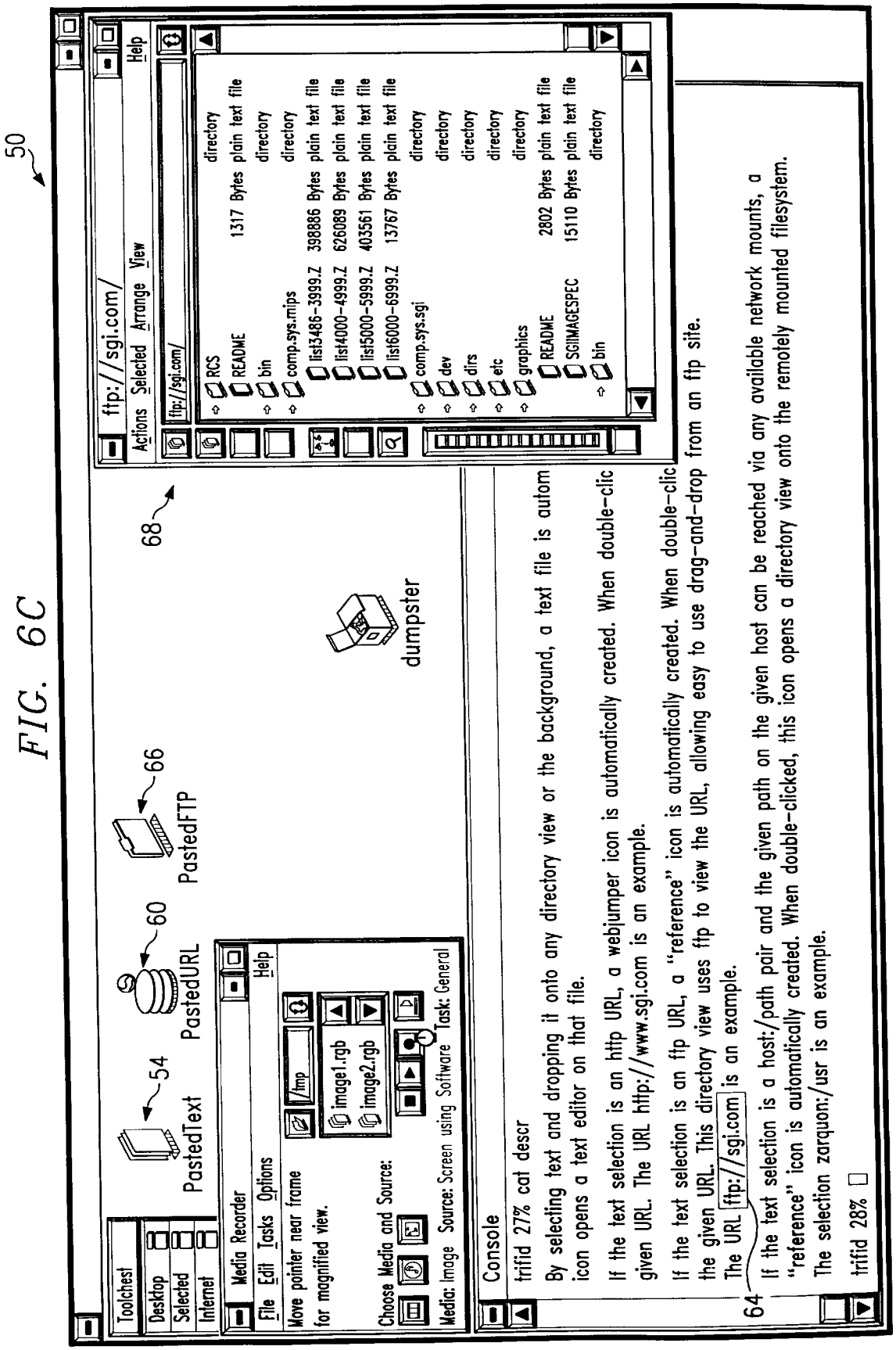

FIGS. 6A, 6B and 6C illustrate one embodiment of creating a desktop icon for a dropped ftp URL. As shown in FIG. 6A, the user has selected an ftp URL, indicated generally at 64. FIG. 6B then illustrates the results of the user dropping the selected ftp URL into desktop 50. The operating system responds by automatically creating a desktop icon, indicated generally at 66, entitled "pasted ftp." FIG. 6C then shows the result of opening icon 66. As shown, opening icon 66 creates a directory view 68 showing the remote resources located at "ftp:\\sti.com."

Figure 7A:
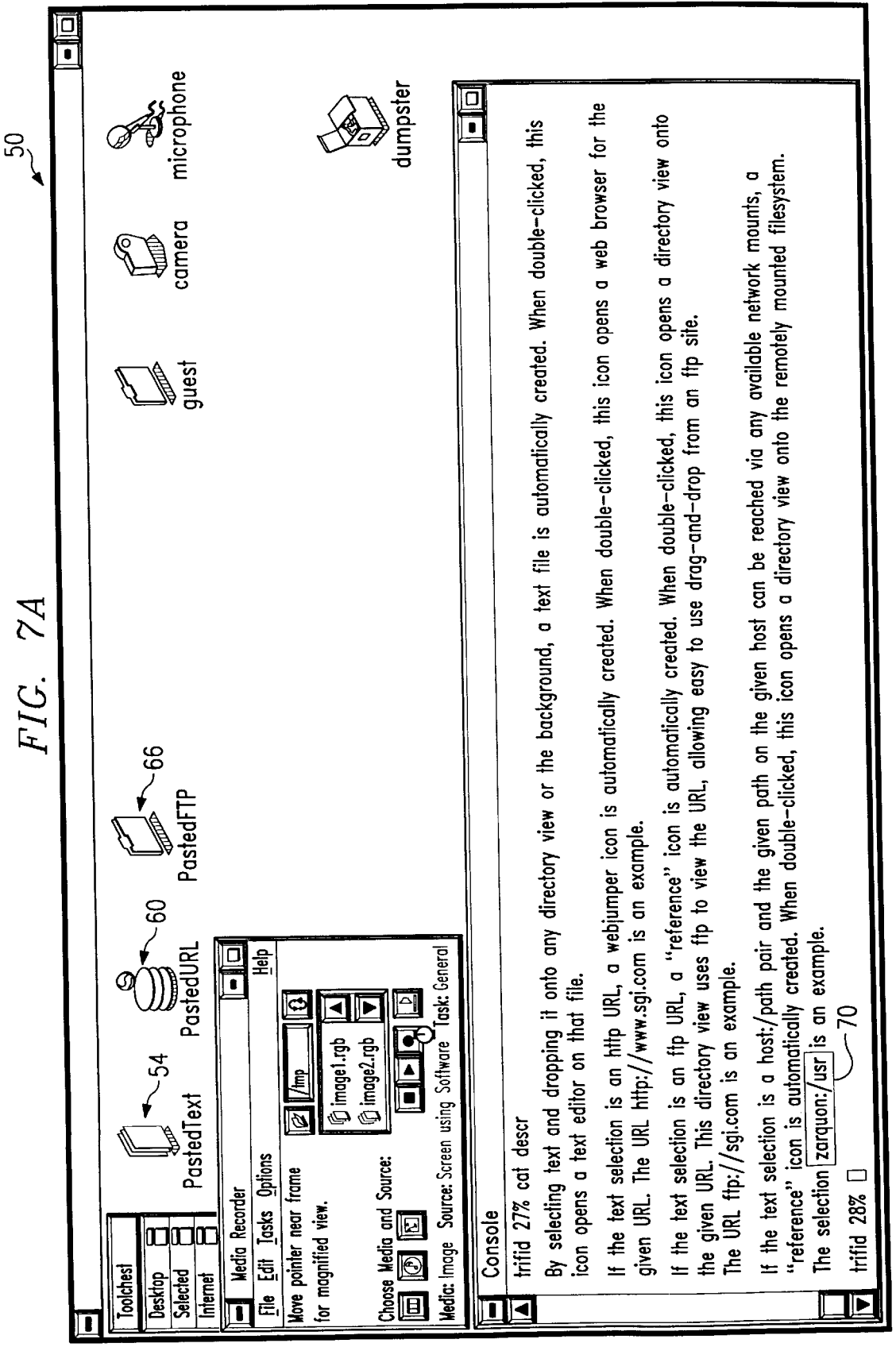
FIGS. 7A, 7B and 7C illustrate one embodiment of creating a desktop icon for a dropped host\path specifier.
Figure 7B:
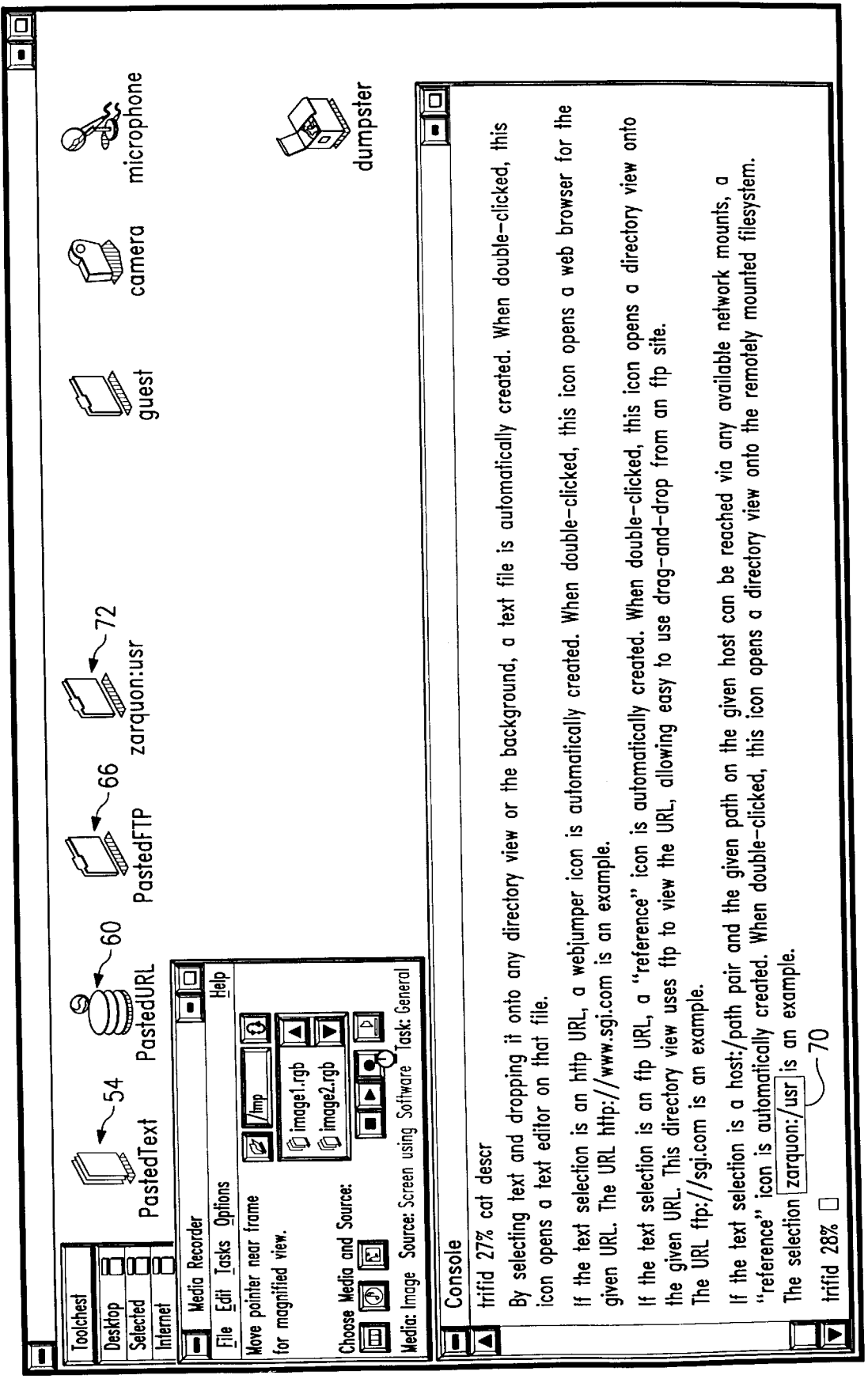
Figure 7C:
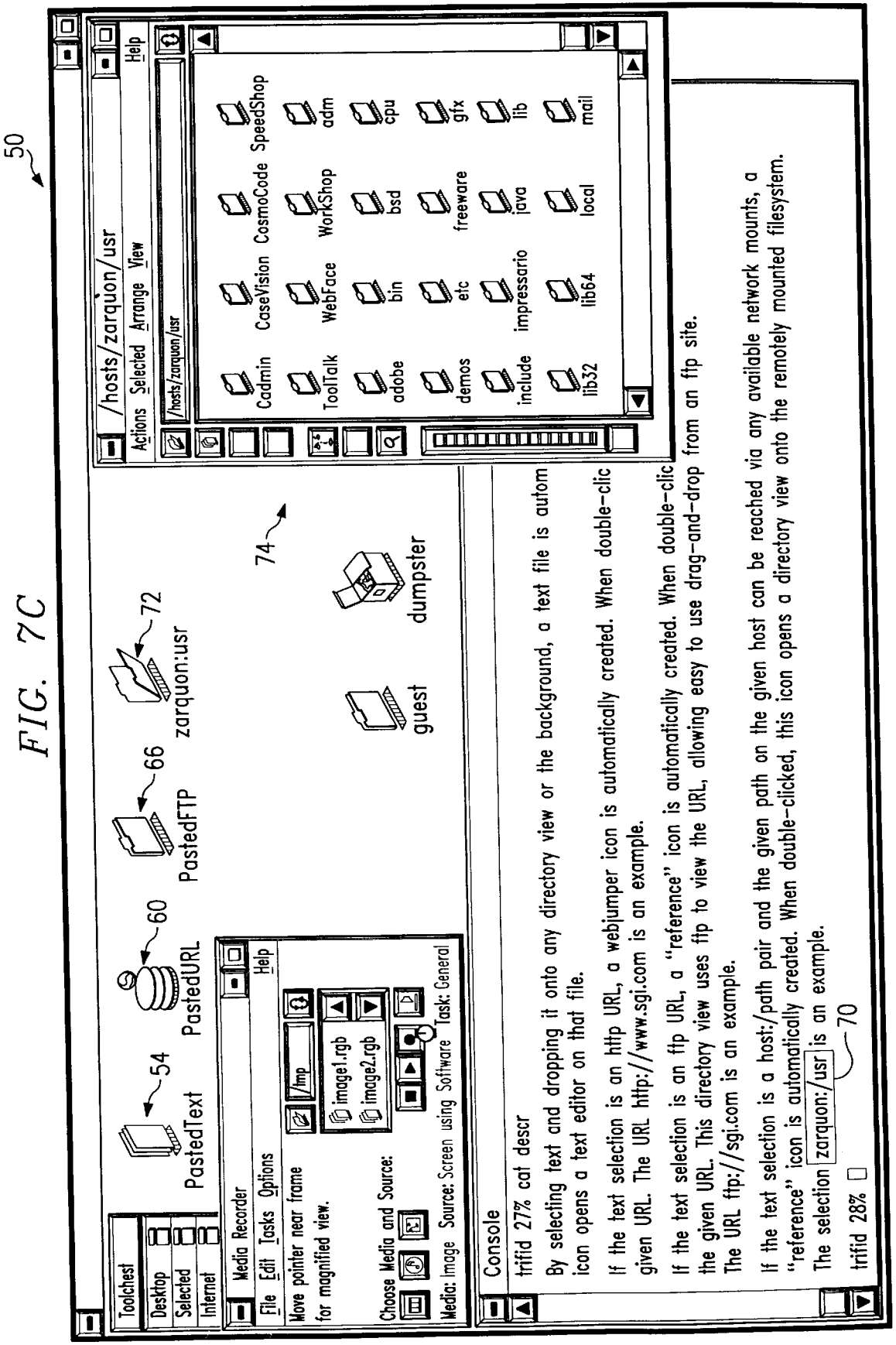

FIGS. 7A, 7B and 7C illustrate one embodiment of creating a desktop icon for a host\path specifier dropped into desktop 50. As shown in FIG. 7A, the user has selected a host\path specifier, indicated generally at 70. FIG. 7B then illustrates the result of the user dropping the selected text into desktop 50. As shown, the operating system creates a desktop icon, indicated generally at 72, which is entitled "zarquon:usr." FIG. 7C shows the result of opening icon 72. As shown, the opening of icon 72 provides a directory view onto the remotely mounted file system showing the resources available at "\hosts\zarquon\usr."

The present invention has been described in detail, it should be understood that various changes, substitutions and alterations can be made thereto without departing from the spirit and scope of the invention as defined by the appended claims.

What is claimed is:

1. A method for automatically creating a desktop icon for access to a remote resource, comprising:

identifying a text drop event in a desktop area of a user interface on a computer system;

analyzing dropped text associated with the text drop event;

determining whether the dropped text is a path name to a remote resource located external to the computer system; and if the dropped text is a path name to a remote resource, creating a desktop icon that, when opened, provides access to the remote resource identified by the dropped text.

2. The method of claim 1, further comprising, if the dropped text is not a path name, creating a desktop icon for a text file containing the dropped text.

3. The method of claim 1, wherein a path name to a remote resource includes an http URL.

4. The method of claim 3, wherein, if the dropped text is an http URL, creating comprises creating a desktop icon that, when opened, invokes a web browser and accesses the http URL specified by the dropped text.

5. The method of claim 1, wherein a path name to a remote resource includes an ftp URL.

6. The method of claim 5, wherein, if the dropped text is an ftp URL, creating comprises creating a desktop icon that, when opened, invokes an ftp application and connects to the ftp URL specified by the dropped text.

7. The method of claim 1, wherein a path name to a remote resource includes a host/path specifier.

8. The method of claim 7, wherein, if the dropped text is a host/path specifier, creating comprises:

finding the host specified by the dropped text;

determining whether there is a way to the specified path;

if there is a way to the specified path, creating a desktop icon for a fast symlink to the host/path specified by the dropped text; and if there is not a way to the specified path, creating a desktop icon that, when opened, invokes an ftp application and connects to the host/path specified by the dropped text.

9. The method of claim 1, wherein path names to remote resources comprise an http URL, an ftp URL, a host/path specifier, a mail path, a news path, a file path, and a gopher path.

10. The method of claim 1, wherein text dropped in a background of the user interface is identified as a text drop event in a desktop area.

11. The method of claim 1, wherein text dropped in a directory view of the user interface is identified as a text drop event in a desktop area.

12. The method of claim 1, wherein creating a desktop icon comprises creating the desktop icon at the location of the text drop event.

13. A system that automatically creates desktop icons for access to remote resources, comprising:

a computer system, the computer system connected to a network allowing connectivity to remote resources located external to the computer system; and an operating system executing on the computer, the operating system providing a user interface on a display, and the operating system operable to:

identify a text drop event in a desktop area of the user interface;

analyze dropped text associated with the text drop event;

determine whether the dropped text is a path name to a remote resource located external to the computer system; and if the dropped text is a path name to a remote resource, create a desktop icon that, when opened, provides access to the remote resource identified by the dropped text.

14. The system of claim 13, wherein the operating system is further operable, if the dropped text is not a path name, to create a desktop icon for a text file containing the dropped text.

15. The system of claim 13, wherein, if the dropped text is an http URL, the operating system creates a desktop icon that, when opened, invokes a web browser and accesses the http URL specified by the dropped text.

16. The system of claim 13, wherein, if the dropped text is an ftp URL, the operating system creates a desktop icon that, when opened, invokes an ftp application and connects to the ftp URL specified by the dropped text.

17. The system of claim 13, wherein, if the dropped text is a host/path specifier, the operating system:

finds the host specified by the dropped text;

determines whether there is a way to the specified path;

if there is not a way to the specified path, creates a desktop icon for a fast symlink to the host/path specified by the dropped text; and if there is not a way to the specified path, creates a desktop icon that, when opened, invokes an ftp application and connects to the host/path specified by the dropped text.

18. The system of claim 13, wherein path names to remote resources comprise an http URL, an ftp URL, a host/path specifier, a mail path, a news path, a file path, and a gopher path.

19. The system of claim 13, wherein the operating system identifies text dropped both in a background of the user interface and in a directory view of the user interface to be a text drop event in a desktop area.

20. The system of claim 13, wherein the operating system creates the desktop icon at the location of the text drop event.

* * * * *